Nov. 17, 1970
L. GROSS
3,540,985
MICROBIOLOGICAL INHIBITION TESTING DEVICE
Filed Nov. 22, 1968
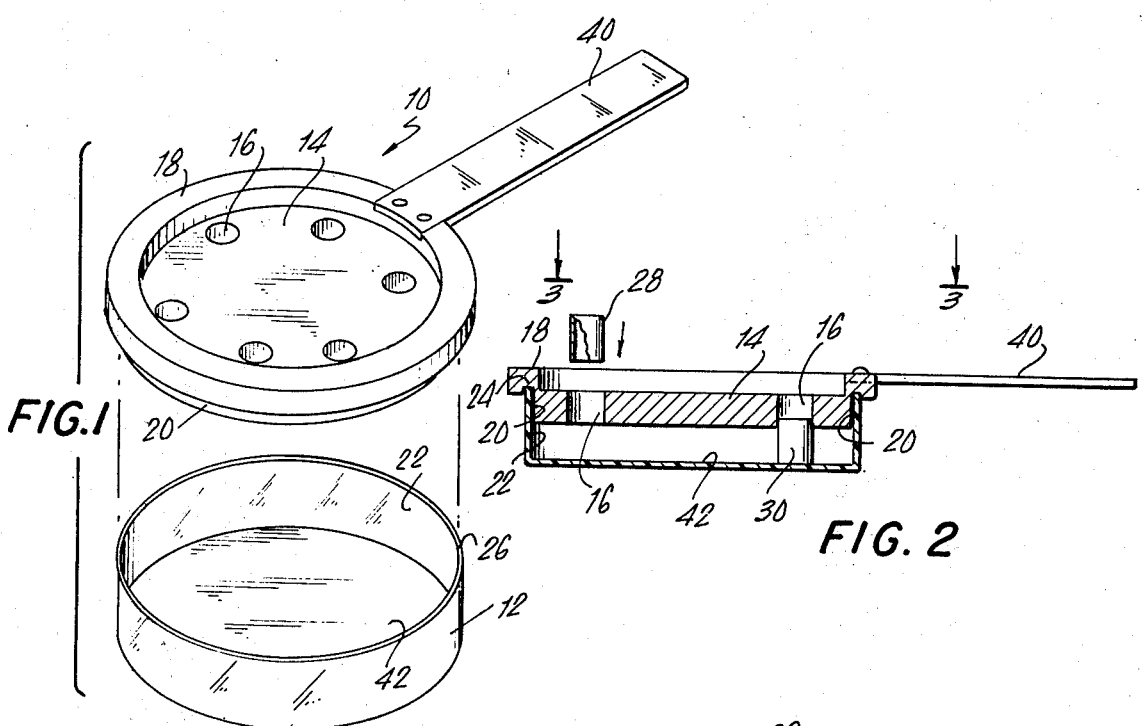
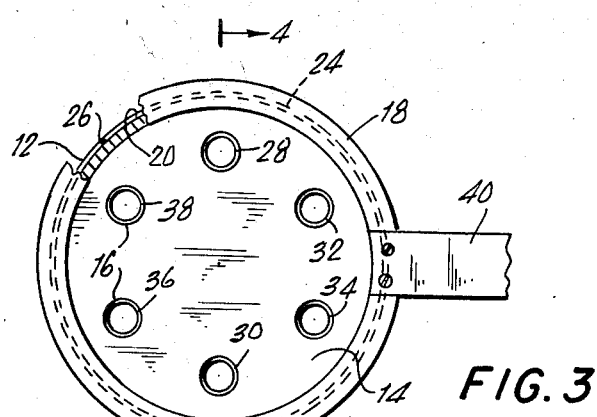
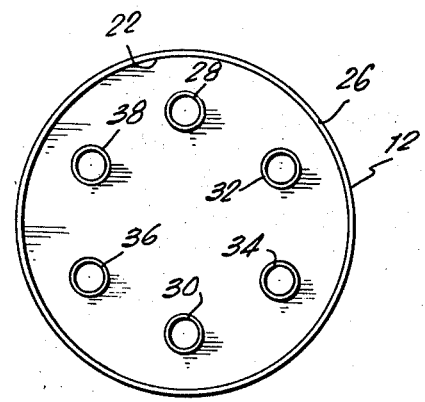
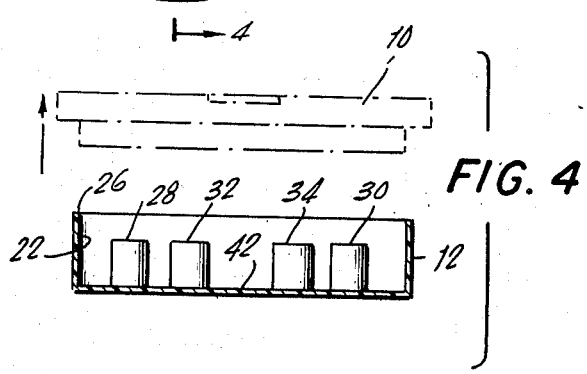
INVENTOR.
LEO GROSS
BY
ATTORNEYS

United States Patent Office 3,540,985
Patented Nov. 17, 1970

3,540,985
MICROBIOLOGICAL INHIBITION TESTING DEVICE
Leo Gross, 36—11 217th St.,
Bayside, N.Y. 11361
Continuation-in-part of application Ser. No. 503,812,
Oct. 23, 1965. This application Nov. 22, 1968, Ser.
No. 786,530
Int. Cl. C12k 1/10
U.S. Cl. 195—127        3 Claims

ABSTRACT OF THE DISCLOSURE

A device for positioning microbiological test cylinders in combination with a Petri dish for use in the assay of the potency of antibiotics and the like, including means for positioning a plurality of test cylinders in a secure manner in a Petri dish in predetermined relative position without the use of a slide.

---

This application is a continuation in part of application Ser. No. 503,812 filed Oct. 23, 1965 and now abandoned.

This invention relates to a microbiological testing device for positioning containers of test material in predetermined spaced relationship to each other, and more particularly to a device for positioning microbiological test cylinders in a Petri dish, for example, during the assay of the potency of antibiotics, or to assay materials for antibiotic activity against various forms of bacteria.

Heretofore the procedure commonly used was to place solutions of the material having antibiotic activity in stainless steel cylinders 10 mm. high, such cylinders having been previously placed on an agar plate in a Petri dish. The diameter of the zone of inhibition of bacterial growth then is a measure of the concentration of antibiotic material. According to customary practice of the prior art, six such cylinders are equally spaced in a circular Petri dish. These cylinders are positioned, according to usual practice, by viewing the lines on a grid placed underneath the Petri dish, or according to another method the cylinders are placed in position by means of a device or spider which holds six of the steel cylinders and lowers them into place. The first mentioned method, namely that of using a slide or grid, is time consuming, and the second required an expensive piece of equipment.

It is therefore an object of the present invention to devise a device for positioning such steel cylinders in a Petri dish without incurring the above mentioned difficulties and disadvantages with the upper ends of the cylinders being disposed below the upper surface of the device to prevent accidental dislocation thereof.

A further object of the invention is to devise a method and apparatus for positioning containers in a Petri dish which is simple to use and inexpensive to manufacture.

Another object of the invention is to provide a positioning device for locating antibiotic assay cylinders in a Petri dish which is simple, effective, and which facilitates maintaining sterility throughout the assaying procedure.

To these ends, and in accordance with one feature of the invention, a novel positioning device, which comprises a flat dish-shaped plate having bores therethrough and a circular recess around its periphery, is placed on top of a standard Petri dish, the top edge of the upstanding wall of the Petri dish fitting into the recess. Six antibiotic assay cylinders are poured from or spilled from a container, in which they have been previously sterilized, onto the top of the sterile positioning device. The steel cylinders are then lowered through the appropriate bores in the plate of the positioning device, and are thus in the proper positions and remain so after the positioning device is removed upwardly.

The positioning aid according to the invention fits on top of the Petri dish and the recess therein forms a labyrinth seal at the upper edge and wall of the Petri dish, thus maintaining sterility throughout the course of the procedure. The depth of positioning of the plate or disc of the positioning device is such that approximately 1 to 2 mm. of the steel cylinders remain within the bore of the plate of the positioning device after the cylinders have been put in place and the bottoms of the cylinders rest on the bottom of the Petri dish or agar plate. The positioning device according to the invention is then removed and the cover of the Petri dish put into place, and the antibiotic assay procedure proceeds in its usual course. The positioning device is flamed before use to assure continued sterility.

The foregoing and more specific objects, advantages and features of my invention, said features being set forth with particularity in the claims annexed hereto, will be apparent from and will be mentioned in the following description of the embodiments of the invention illustrated by way of example in the accompanying drawing in which:

FIG. 1 is an exploded perspective view of a guide device according to the invention shown in lifted position over a Petri dish;

FIG. 2 is an elevational cross sectional view of the positioning device according to the invention in position on the Petri dish, with one assaying cylinder in position and a second assaying cylinder shown in raised position over a bore in the device ready to be placed in position;

FIG. 3 is a plan view taken along the plane of line 3—3 of FIG. 2;

FIG. 4 is a cross section taken along the plane of line 4—4 of FIG. 3, with the positioning device shown in raised position in phantom lines; and, FIG. 5 is a plan view of a Petri dish with assaying cylinders positioned therein according to the invention, after the positioning device has been removed.

The same numerals are used to designate the same parts throughout the several figures.

As shown in FIG. 1, a microbiological testing device or positioning device, generally indicated by the numeral 10, is shown in raised position over a conventional Petri dish 12 for use in combination therewith and without a slide. The positioning device or guide 10 comprises a disc or disc-shaped plate 14 having a plurality of discrete bores 16 therethrough. Around the outer periphery of the disc 14 is flange 18 whose top surface is spaced upwardly from the level upper surface of the disc-shaped plate 14. The disc 14 defines upright peripheral walls 20 which are adapted to fit inside the upright walls 22 of the Petri dish and spaced from the bottom 42 thereof. The circular recess 24 at the juncture of the walls 20 and the bottom of the flange 18 serve to form a labyrinth seal with the upright wall 22 of a Petri dish when the positioning guide 10 is placed in a position shown in FIG. 2. The vertically offset circumferential ring or flange 18 thus serves to support the device 10 on the upper edge 26 of the Petri dish. It will be noted that the bores 16 in the illustrated embodiment are all equally spaced from each other with their centers on a circle whose diameter is smaller than the circle defined by the circular recess 24.

The thickness of the disc 14 at the bores 16 is such that approximately 1 to 2 millimeters of the upper end of assay cylinders 28, 30, 32, 34, 36, 38 remain within the bores 16 when the bottoms of these cylinders rest on the bottom of the Petri dish, as best shown in the position of cylinder 30 in FIG. 2.

A handle 40 is recessed into and fixed in relationship to the flange 18 for lifting and handling the device 10, and for rotating it relative to the Petri dish 12.

In FIG. 3 a portion of the flange 18 has been cut away in order to better illustrate the construction.

The method of positioning containers of test material according to the invention is as follows: A plurality of empty sterilized antibiotic test cylinders 28, 30, 32, 34, 36, 38 are first sterilized and are then spilled or dumped into the dish-shaped space defined by the horizontal upper surface of disc 14 and the inner upright peripheral wall of the flange 18. Then, using a sterile tool or other means, the test cylinders are slipped down into the bores 16 until their bottoms rest upon the inner bottom surface 42 of the Petri dish 12, or upon an agar plate (not shown) resting upon the bottom 42. After the cylinders are lowered through the appropriate holes 16, they are in the proper position for conducting the microbiological test in the usual manner, after the positioning device 10 is removed and the cover (not shown) of the Petri dish is put in place on the Petri dish 12. The antibiotic assay procedure then proceeds in its conventional course.

It will be obvious to those skilled in the art, upon a study of this disclosure, that my invention permits of a great variety of modifications and alterations with respect to the mode of operation as well as to the details of the construction of the device, and hence can be given embodiments other than those particularly illustrated and described herein, without departing from the essential features of my invention and within the scope of the claims annexed hereto.

I claim:

1. A microbiological testing device in combinaiton with and for positioning containers of test material in a Petri dish in predetermined spaced relationship to each other comprising a Petri dish having a bottom and an upright cylindrical wall, a disc shaped plate having a plurality of discrete bores therethrough spaced above said Petri dish bottom and having its upright peripheral wall received in and abutting the top of the inner surface of the upright cylindrical wall of said Petri dish, a peripheral flange integral with the peripheral wall of said plate and extending upwardly and circumferentially outwardly of said plate, said flange having its upper surface above the upper surface of said plate and its bottom surface above the lower surface of said plate, the bottom surface of said flange having recess means therein of a diameter, width and depth for receiving said upright cylindrical wall of said Petri dish and for forming a labyrinth seal between said upright peripheral wall of said plate, the bottom surface of said flange, and said upright cylindrical wall of said Petri dish, a plurality of containers removably received in said bores and extending through said bores with said containers being positioned in a circle inwardly of said flange, the thickness of said plate at said bores being such that 1 to 2 mm. of the upper ends of said containers remain in said bores with said containers resting on said bottom of said Petri dish, and handle means attached to said flange on said upper surface thereof.

2. A microbiological testing device according to claim 1, wherein the height of said containers is greater than the thickness of said plate, and is greater than the space between the plate and said bottom of said Petri dish, but less than the combined height of the thickness of said plate and the space between said plate and said Petri dish bottom.

3. A microbiological testing device according to claim 2, wherein said bores are radially spaced from the center of said plate and are circularly arranged.

References Cited

UNITED STATES PATENTS 2,533,089 12/1950 Brewer.
3,165,450 1/1965 Scheidt.

OTHER REFERENCES

Beadle et al., Journal of Bacteriology, vol. 49, pages 101–104 (1945).

ALVIN E. TANENHOLTZ, Primary Examiner

U.S. Cl. X.R.
195—103.5